United States Patent Office 2,913,459
Patented Nov. 17, 1959

2,913,459

NEW QUATERNARY AMMONIUM COMPOUNDS AND PROCESS FOR THE PRODUCTION THEREOF

Hans Suter, Dorflingen, and Werner Kündig, Schaffhausen, Switzerland, assignors to Eprova Limited, Schaffhausen, Switzerland No Drawing. Application December 6, 1955
Serial No. 551,235

Claims priority, application Switzerland
December 9, 1954

7 Claims. (Cl. 260—247.7)

This invention is concerned with novel quaternary ammonium compounds which are effective therapeutic agents for soothing coughs. The invention also relates to a process for the production of these new compounds.

The quaternary ammonium compounds of the invention are compounds of the general formula

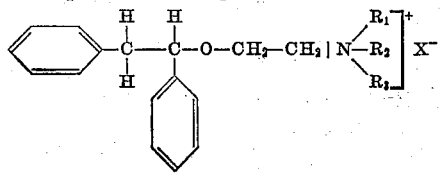

in which $R_1$, $R_2$ and $R_3$ represent lower alkyl groups and $X^-$ represents one equivalent of an anion, for example a halogen ion, nitrate ion, sulphate ion, alkyl-sulphate ion, or alkyl-sulphonate ion. $R_1$ and $R_2$ together can also be constituents of a saturated ring system, such as a pyrrolidine-, piperidine- or morpholine-ring.

It has been found that compounds according to the invention have a specific cough-soothing action in very small concentrations. Their degrees of compatability are very good. In contrast to the cough remedies containing morphine alkaloid or containing synthetic analgesic substances, no secondary effect such as euphoria, sickness accumulation or analgesia could be observed when the compounds according to the invention were used clinically, even when administered over a relatively long period.

The compounds are readily soluble in water and can without difficulty be worked up into any desired galenic form.

A feature of particular significance with these novel compounds is the great difference in quantity between an effective and a toxic dose, which permits completely safe use.

The therapeutic index of N-β-(1,2-diphenylethoxy)-ethyl-N-trimethyl-ammonium-bromide is for example in the region of 600. Consequently, even when using very excessive doses, no undesirable secondary effects could be observed in the clinic.

Moreover, even with continuous administration, for example, when treating the irritating cough in cases of chronic lung tuberculosis, it was not possible to detect any secondary effects, any subsidence of the efficacy, or habit-forming effects or any abstinence phenomena when the remedy is discontinued. These effects always occur to a greater or lesser degree with the conventional cough remedies containing alkaloid.

The unmodified tertiary N-β-(1,2-diphenylethoxy)-ethyl-N-dialkyl amines forming the basis of the quaternary ammonium compounds of the invention do not, in contrast, to the compounds of the invention, have any subduing action on the cough reflex, even with much heavier dosing.

The new compounds of the invention are prepared by reacting a tertiary amine with a reactive ester of a strong inorganic or organic acid according to the reaction scheme A or B

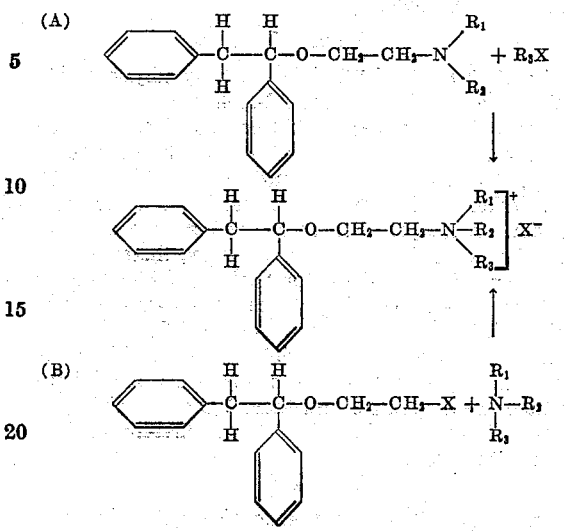

wherein all symbols have the meaning given herein above. The more readily volatile reactant is preferably used in excess.

The anion can be exchanged as desired by double decomposition with salts, for example NaI or $AgNO_3$.

Example 1

22.2 g. of N-β-(1,2-diphenylethoxy)-ethyl-N-dimethyl amine (Am. Soc. 70, 3098) are dissolved in a bomb tube in 25 cc. of benzene. A sealed thin-walled ampoule containing 8.6 g. of methyl bromide is also placed in the bomb tube. The tube is cooled to low temperature and sealed off. The tube is now heated to room temperature and the thin-walled ampoule located in the bomb-tube is shattered by vigorous shaking and the whole is maintained for 12 hours at room temperature. An oil soon separates and this oil gradually solidifies completely. The reaction mixture is dissolved in methanol, filtered and evaporated. The residual oil is dissolved in 200 cc. of ethyl acetate and concentrated until a strong opalescence is produced. The solution, which is still hot, is seeded and crystallisation then takes place immediately. After 12 hours, the colourless flakes are filtered with suction and dried. The yield is 27.5 g. or 91% of the theoretical.

A larger quantity (260 g. of N-β-(1,2-diphenylethoxy)-ethyl-N-dimethyl amine) was reacted in the same way in an autoclave and 341.6 g. (97% of the theoretical) of pure product were obtained.

The novel ammonium compound, which is {[N-β-(1,2-diphenyl - ethoxy) - ethyl - N - trimethyl] - ammonium}-bromide, melts at 144–147° C., is readily soluble in cold water, methanol and ethanol and is practically insoluble in boiling ethyl acetate, benzene, ether and ligroin.

The reaction described above can also be carried out in ethyl acetate in which case the pure compound is directly produced. In this case, the addition of the methyl bromide takes place without the use of the tin glass ampoule, so avoiding the possibility of glass splinters being included in the final product.

2.7 g. of N-β-(1,2-diphenylethoxy)-ethyl-N-dimethyl amine and 1.4 g. of methane-sulphonic acid methyl ester are converted into N-β-(1,2-diphenylethoxy)-ethyl-N-trimethyl ammonium methane sulphonate by heating in 15 cc. of methanol in the manner described above.

A similar reaction with 6 g. of N-β-(1,2-diphenyl-ethoxy)-ethyl-piperidine (Helv. 34, 1657 (1951)) and 3 g. of methyl bromide in 20 cc. of benzene in a sealed tube yields N-β-(1,2-diphenyl-ethoxy)-ethyl-N-methyl-piperidinium-bromide.

The reaction of 5 g. of N-β-(1,2-diphenyl-ethoxy)-ethyl-pyrrolidin (Am. Soc. 70, 3098) with 2.5 g. of methyl-bromide gives N-β-(1,2-diphenyl-ethoxy)-ethyl-N-methyl-pyrrolidinium-bromide.

Example 2

20.5 g. (0.1 mol) of 1,2-diphenylethoxy-ethyl-bromide (obtained by reacting sodium-1,2-diphenyl-ethanol with excess ethylene bromide) in 150 cc. of chloroform are heated for 48 hours at 100° C. in a sealed bomb tube or in a citrate flask with 12 g. (about 0.2 mol) of trimethyl amine. After cooling, the chloroform is evaporated and the residue is recrystallised from ethyl acetate or from methanol and ethyl acetate. In this way, there are obtained 27 g. (74% of the theoretical) of {[N-β-(1,2-diphenylethoxy) - ethyl - N - trimethyl - ]ammonium}-bromide with a melting point of 143–146° C.

In the same manner it is possible to produce N-β-(1,2-diphenylethoxy) - ethyl - N - methyl - morpholinium-bromide by heating in a sealed tube, 2 g. of 1,2-diphenyl-ethoxy-ethyl-bromide with 1.5 g. of N-methyl-morpholine in 20 cc. of benzene.

Example 3

27 g. of N-β-(1,2-diphenyl-ethoxy)-ethyl-N-dimethyl-amine are heated to about 90–100° C. in a closed vessel with 13 g. of isopropyl bromide (a large excess is to be avoided) in 50 cc. of benzene, the mixture being heated for 6 hours, after which it is allowed to cool. Crystallisation takes place after standing for a relatively long period. The crystals are filtered with suction and dried.

The product, which is {[-N-β-(1,2-diphenylethoxy)-ethyl-N-isopropyl-dimethyl]-ammonium}-bromide melts at 113–115° C.; it is readily soluble in water and lower alcohols but is sparingly soluble even in boiling ethyl acetate, ether and benzene.

Having thus described our invention, what we claim as new and desire to protect by Letters Patent of the United States is:

1. New chemical compounds selected from the class consisting of quaternary ammonium compounds of the general formula

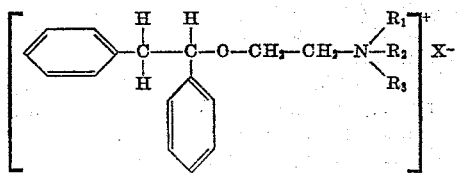

wherein $R_1$ represents a lower alkyl group, and $R_2$ and $R_3$ are selected from the group consisting of lower alkyl groups and together with the nitrogen atom form a saturated ring selected from the group consisting of pyrrolidine, piperidine, and morpholine, and $X^-$ is an ion selected from the group consisting of bromine and iodine.

2. The new chemical compound of the formula

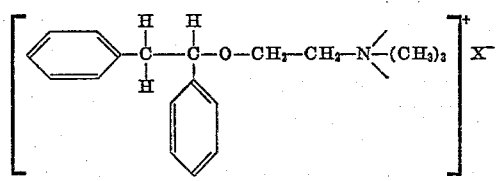

wherein $X^-$ is an ion selected from the group consisting of bromine and iodine.

3. The new chemical compound of the formula

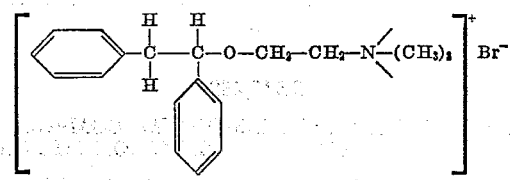

4. The new chemical compound of the formula

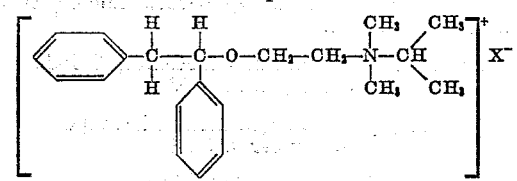

wherein $X^-$ is an ion selected from the group consisting of bromine and iodine.

5. The new chemical compound of the formula

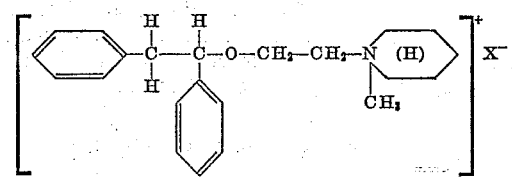

wherein $X^-$ is an ion selected from the group consisting of bromine and iodine.

6. The new chemical compound of the formula

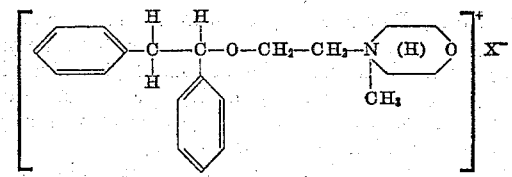

wherein $X^-$ is an ion selected from the group consisting of bromine and iodine.

7. The new chemical compound of the formula

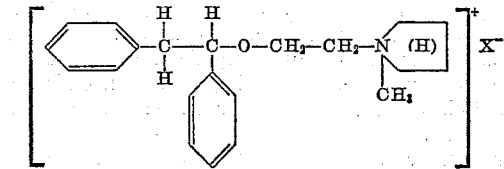

wherein $X^-$ is an ion selected from the group consisting of bromine and iodine.

References Cited in the file of this patent

UNITED STATES PATENTS

| | | |
|---|---|---|
| 2,397,799 | Martin et al. | Apr. 2, 1946 |
| 2,508,422 | Rieveschl | May 23, 1950 |
| 2,683,742 | Cusic | July 13, 1954 |

OTHER REFERENCES

Wright et al.: Journal of the American Chemical Society, vol. 70, pp. 3098–3100, May 16, 1948.

Buchi et al.: Helvetica Chimica Acta, vol. 34, pp. 1657–1663 (1951).

Idson: Chemical Reviews, vol. 47, number 3, p. 390, December 1950.